(12) United States Patent  
Nichols et al.

(10) Patent No.: US 9,746,329 B2  
(45) Date of Patent: Aug. 29, 2017

(54) SYSTEMS AND METHODS FOR AUGMENTING AN INERTIAL NAVIGATION SYSTEM

(75) Inventors: Mark Edward Nichols, Chirstchurch (NZ); Adam John Gudat, Chillicothe, IL (US); Richard Piekutowski, Huber Heights, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 1904 days.

(21) Appl. No.: 11/594,142

(22) Filed: Nov. 8, 2006

(65) Prior Publication Data

US 2008/0109141 A1 May 8, 2008

(51) Int. Cl.
G01C 21/16 (2006.01)
E02F 3/84 (2006.01)
G01S 19/49 (2010.01)
G01S 17/02 (2006.01)

(52) U.S. Cl.
CPC ............ G01C 21/165 (2013.01); E02F 3/842 (2013.01); E02F 3/847 (2013.01); G01S 19/49 (2013.01); G01S 17/023 (2013.01)

(58) Field of Classification Search
CPC ........ G01C 21/165; E02F 3/842; E02F 3/847; G01S 19/49; G01S 17/023
USPC ......... 701/50, 220, 207, 213, 214, 215, 216, 701/217, 221; 172/4.5
See application file for complete search history.

(56) References Cited

U.S. PATENT DOCUMENTS

| | | | | |
|---|---|---|---|---|
| 4,244,123 A | * | 1/1981 | Lazure et al. | 37/348 |
| 4,792,904 A | * | 12/1988 | Reinagel et al. | 701/17 |
| 4,807,131 A | * | 2/1989 | Clegg | 701/50 |
| 4,820,041 A | * | 4/1989 | Davidson et al. | 356/3.12 |
| 4,918,607 A | * | 4/1990 | Wible | 701/23 |
| 5,367,458 A | * | 11/1994 | Roberts et al. | 701/25 |
| 5,375,663 A | * | 12/1994 | Teach | 172/4.5 |
| 5,438,817 A | * | 8/1995 | Nakamura | 56/10.2 A |

(Continued)

FOREIGN PATENT DOCUMENTS

| | | |
|---|---|---|
| CN | 1361409 | 7/2002 |
| EP | 1 580 571 A1 | 9/2005 |

(Continued)

OTHER PUBLICATIONS

Chinese Office Action pertaining to Chinese Application No. 200710166980.2, dated Mar. 9, 2011.

(Continued)

*Primary Examiner* — Thomas G Black
*Assistant Examiner* — Sze-Hon Kong
(74) *Attorney, Agent, or Firm* — Dinsmore & Shohl LLP

(57) ABSTRACT

Systems and methods for augmenting an inertial navigation system (INS) include outputting from the INS position information associated with the implement and adjusting the implement based upon a comparison of the position information of the implement and a desired position of the implement. The INS is periodically re-initialized using error estimates generated by a kalman filter as a function of position information from one or more positioning (or measuring) devices, such as a fan laser, an automatic total station (ATS), a GNSS receiver, or a ground based radio positioning system, to correct a drift of the position information that may be caused by inherent characteristics of the INS.

21 Claims, 3 Drawing Sheets

(56) References Cited

U.S. PATENT DOCUMENTS

| | | | |
|---|---|---|---|
| 5,462,122 A * | 10/1995 | Yamamoto et al. | 172/2 |
| 5,471,218 A | 11/1995 | Talbot et al. | |
| 5,528,888 A * | 6/1996 | Miyamoto et al. | 56/10.2 F |
| 5,551,518 A * | 9/1996 | Stratton | 172/4.5 |
| 5,606,850 A * | 3/1997 | Nakamura | 56/10.2 A |
| 5,631,658 A * | 5/1997 | Gudat et al. | 342/457 |
| 5,746,511 A | 5/1998 | Eryurek et al. | |
| 5,764,511 A * | 6/1998 | Henderson | 700/66 |
| 5,928,309 A * | 7/1999 | Korver et al. | 701/214 |
| 5,951,612 A * | 9/1999 | Sahm | 701/50 |
| 5,951,613 A * | 9/1999 | Sahm et al. | 701/50 |
| 5,955,973 A * | 9/1999 | Anderson | 340/988 |
| 6,112,145 A * | 8/2000 | Zachman | 701/50 |
| 6,253,160 B1 * | 6/2001 | Hanseder | 702/95 |
| 6,308,134 B1 | 10/2001 | Croyle et al. | |
| 6,349,249 B1 * | 2/2002 | Cunningham | 701/28 |
| 6,417,802 B1 | 7/2002 | Diesel | |
| 6,433,866 B1 | 8/2002 | Nichols | |
| 6,450,267 B2 * | 9/2002 | Ohtomo et al. | 172/4.5 |
| 6,452,668 B1 | 9/2002 | Pratt | |
| 6,480,152 B2 | 11/2002 | Lin et al. | |
| 6,501,543 B2 | 12/2002 | Hedges et al. | |
| 6,519,029 B1 | 2/2003 | Hedges et al. | |
| 6,535,282 B2 | 3/2003 | Hedges et al. | |
| 6,545,751 B2 | 4/2003 | Beliveau et al. | |
| 6,618,133 B2 | 9/2003 | Hedges et al. | |
| 6,621,565 B2 | 9/2003 | Pratt et al. | |
| 6,630,993 B1 | 10/2003 | Hedges et al. | |
| 6,662,103 B1 | 12/2003 | Skolnick et al. | |
| 6,671,600 B1 * | 12/2003 | Hintzy | 701/50 |
| 6,691,437 B1 * | 2/2004 | Yost et al. | 37/348 |
| 6,701,239 B2 * | 3/2004 | Keefer | 701/50 |
| 6,966,387 B2 * | 11/2005 | Marriott et al. | 172/4.5 |
| 7,110,102 B2 * | 9/2006 | Ohtomo et al. | 356/141.4 |
| 7,121,355 B2 * | 10/2006 | Lumpkins et al. | 172/4.5 |
| 7,123,186 B2 | 10/2006 | Brabec et al. | |
| 7,139,651 B2 * | 11/2006 | Knowlton et al. | 701/50 |
| 7,144,191 B2 * | 12/2006 | Kieranen et al. | 404/84.1 |
| 7,317,977 B2 * | 1/2008 | Matrosov | 701/50 |
| 7,456,943 B1 * | 11/2008 | Goad et al. | 356/139.01 |
| 7,504,995 B2 * | 3/2009 | Lawrence et al. | 342/357.37 |
| 7,513,070 B2 * | 4/2009 | Ogura et al. | 37/348 |
| 7,526,402 B2 * | 4/2009 | Tanenhaus et al. | 702/151 |
| 7,588,088 B2 * | 9/2009 | Zachman | 172/4.5 |
| 7,617,061 B2 * | 11/2009 | Brabec | 702/97 |
| 7,640,683 B2 * | 1/2010 | McCain | 37/348 |
| 7,831,362 B2 * | 11/2010 | Ishibashi et al. | 701/50 |
| 2002/0162668 A1 * | 11/2002 | Carlson et al. | 172/4.5 |
| 2003/0137658 A1 * | 7/2003 | Ohtomo et al. | 356/141.4 |
| 2004/0054457 A1 * | 3/2004 | Kormann | 701/50 |
| 2004/0125365 A1 | 7/2004 | Ohtomo et al. | |
| 2005/0187731 A1 * | 8/2005 | Ericsson et al. | 702/92 |
| 2005/0197756 A1 * | 9/2005 | Taylor et al. | 701/50 |
| 2005/0212702 A1 * | 9/2005 | Brabec et al. | 342/357.09 |
| 2006/0041361 A1 | 2/2006 | Matrosov | |
| 2006/0042804 A1 * | 3/2006 | Pecchio | 172/4.5 |
| 2006/0282205 A1 * | 12/2006 | Lange | 701/50 |
| 2007/0050193 A1 * | 3/2007 | Larson | 705/1 |
| 2007/0168100 A1 * | 7/2007 | Danko | 701/50 |
| 2007/0271037 A1 * | 11/2007 | Overstreet et al. | 701/220 |
| 2008/0087447 A1 * | 4/2008 | Piekutowski | 172/3 |
| 2009/0069987 A1 * | 3/2009 | Omelchenko et al. | 701/50 |
| 2009/0093959 A1 * | 4/2009 | Scherzinger et al. | 701/215 |

FOREIGN PATENT DOCUMENTS

| | | |
|---|---|---|
| JP | 7239236 A | 9/1995 |
| JP | 7301541 A | 11/1995 |
| JP | 9154308 A | 6/1997 |
| JP | 9189564 A | 7/1997 |
| JP | 2005283600 A | 10/2005 |

OTHER PUBLICATIONS

Office Action dated May 3, 2012 pertaining to Chinese Patent Application No. 200710166980.2.

Translation of Official Notice of Rejection, dated Jul. 6, 2012, pertaining to Japanese Patent Application No. 2007-291205, filed Nov. 8, 2007.

* cited by examiner

SYSTEMS AND METHODS FOR AUGMENTING AN INERTIAL NAVIGATION SYSTEM

This disclosure relates generally to a system and method for providing position information with an inertial navigation system.

BACKGROUND

Earthmoving machines such as bulldozers, wheel loaders, and other earth moving equipment may alter a landscape of a worksite in accordance with a predetermined plan. The predetermined plan may specify certain dimensions and specifications of the worksite, and the earthmoving machines may alter the landscape accordingly. The predetermined plan may require work to be done by the earthmoving machines, such as covering the worksite with a particular material, excavating material from the worksite, or cutting the ground of the worksite to a finished predetermined profile. The machines may have an implement (e.g., a bulldozer blade) to carry out these actions.

Earthmoving machines may contain devices to aid operators in performing work on the worksite. One such device relates to positioning equipment configured to intermittently receive a horizontal position (or location) and a vertical position (or elevation) of the machine relative to the ground surface. Using the received information, the machine may have automatic controllers (e.g., an automatic implement control system) to adjust the implement to a desired height. For example, the automatic implement controller may move a blade on a bulldozer in an upward or downward direction based upon a difference between a detected elevation of the machine (e.g., a vertical position) and a target height of the blade (e.g., a desired vertical position depending on the predetermined plan). If the predetermined plan specifies, for example, that an elevation of the ground should be a certain level, the blade may be moved down to grade the ground to that level or up to cover the ground with material up to that level.

Currently, position information, such as the height (or the vertical position) of the blade, may be detected using several different techniques. One such technique involves receiving position information from a satellite positioning system, such as Global Position System (GPS), GLONASS or collectively to any Global Navigation Satellite System (GNSS). Satellite positioning systems include a constellation of satellites and require a satellite positioning receiver located on the earthmoving machine. The positioning receiver may receive position information from the satellite positioning system at a rate of 0.1 to 100 Hz and in practice may run at 10 Hz or 20 Hz.

Another positioning device is a robotic total station or automatic total station (ATS). The ATS includes an instrument which remotely determines the position of the implement, and sends signals to a receiver provided on the machine to adjust the implement position.

The instrument of the ATS uses a servomotor to track a machine and angle encoders to measure angles in a horizontal plane relative to the ground surface (x and y coordinates) and an elevation axis (z coordinate) relative to the ground surface. The instrument further includes an electronic distance meter, which transmits a laser beam of visible or infrared light to a prism or reflective surface provided on a machine. Light is then reflected back to the instrument which, in turn, calculates the distance between the machine and the instrument. Using the known position of the ATS, the measured angles and the measured distance, position information of the machine may be determined. Generally, an ATS locks onto the target as it moves around a worksite and constantly updates position information of the machine, which is used to adjust the implement if necessary. Current instruments may update at a rate of up to 6 Hz.

Another position device is a rotary laser, which rotates a laser beam to form an optical reference plane over the surface of the worksite at a rate of, for example, 600 RPM. The optical reference plane may be oriented vertically, horizontally, or at a known slope in one or two directions relative to the worksite surface. A photodetector device, which is typically mounted on the earth moving machine, receives light emitted by the laser, for example, at a rate of once every 100 msec, and generates a positioning signal in response thereto. A processor then controls the height of the implement based on the positioning signal.

Another position device is a fan laser, which rotates one or more fan shaped laser beams to enable a receiver to determine vertical angle or difference in elevations over the surface of the worksite at a rate of, for example, 3000 RPM. A photodetector device, which is typically mounted on the earthmoving machine, receives light emitted by the laser, for example, at a rate of once every 20 msec, and generates a positioning signal in response thereto. A processor then controls the height of the implement based on the positioning signal. An example of a fan laser is described in U.S. Application No. U.S. 2004/0125365 A1, which is discussed in further detail below.

Another type of positioning device is an inertial navigation system (INS), which determines position and attitude information of the earthmoving machine at a rate, for example, greater than 100 times per second. The INS may use an inertial measurement unit (IMU) that includes a set of sensors that measure six (6) degrees of freedom—three (3) linear degrees of freedom (such as x, y, and z coordinates in space) and three (3) rotational degrees of freedom such as (pitch, yaw, and roll). The linear degrees of freedom specify a position, and the rotational degrees of freedom specify attitude.

The IMU typically includes three (3) linear accelerometers for determining position and three (3) rate gyroscopes for determining attitude. Based upon the measurements of position and attitude, a computational unit, such as an analog circuit or microcontroller, may determine position and attitude information of the earthmoving machine. Mathematically, position information can be quickly determined by twice integrating a series of acceleration values obtained by the accelerometers, and the attitude information is determined by integrating once a series of rate measurements output from the rate gyroscopes.

Each accelerometer and rate gyroscope reading typically includes a relatively small amount of noise, which is summed during integration. The calculated position and attitude information is thus not precise, but can be known within a given degree of error. The INS, however, determines the position of the implement and updates the current position and attitude of the machine based on position and attitude information. Thus, although attitude and position information may be obtained within an acceptable margin of error, the error in such information, otherwise referred to as "drift", can accumulate over time to an unacceptable amount. On a worksite, however, accurate machine position information is required over extended periods of time. Accordingly, INS systems typically have not independently been used to determine positions of earthmoving machines.

Typically, earthmoving machines may use one of GPS, ATS, fan laser, or plane laser positioning devices when carrying out earthmoving functions. For example, a GPS positioning device may be provided on the earth moving machine to determine location and elevation information of the machine. Although location information can be accurately obtained, elevation information is considerably more inaccurate. Accordingly, as disclosed in the above-noted U.S. Patent Publication No. U.S. 2004/0125365 A1 to Ohtomo et al., GPS and laser systems are combined to provide accurate elevation and location information.

In particular, Ohtomo et al. discloses a position measuring system that includes a fan laser and a photodetection sensor that receives a laser beam emitted from the rotary laser device. The photodetection sensor may be mounted on an earthmoving machine, and in response to light from the rotary laser device, may determine elevation information of the machine. Thus, in Ohtomo et al., the rotary laser system provides elevation information, which is more accurate than the GPS system. The earthmoving machine also includes a GPS receiver, which receives data for determining a location or horizontal position. In addition, location or horizontal information is obtained based on received GPS data.

The combined GPS and fan laser system disclosed in Ohtomo et al., however, generates position and elevation information less frequently than desired for automatic real time control of a cutting implement, for example, a blade. Accordingly, there is a need for a position monitoring system that can generate accurate position and elevation information with greater frequency and during periods when either or both of the GPS signals or the laser signals may be blocked.

The disclosed system is directed at overcoming one or more of the shortcomings in the existing technology.

SUMMARY OF THE INVENTION

In accordance with one aspect of the present disclosure, a system is provided for automatically adjusting an implement. The system includes an inertial navigation system configured to output first position information associated with the implement and a processor configured to compare the first position information with a desired vertical position and generate a comparison signal in response thereto. A valve controller is further provided which is configured to adjust the implement based upon the comparison signal. The system also includes a measuring device coupled to the inertial navigation system configured to output second position information to the inertial navigation system. The inertial navigation system is periodically re-set from the measuring device to modify the first position information based upon an error estimate generated as a function of the first position information and the second position information.

According to another aspect, there is provided a method for automatically adjusting an implement for an earthmoving machine. The method includes receiving a first signal from an inertial navigation system. The signal from the inertial navigation system represents first position information. The method also includes calculating a position based upon the first signal and comparing the position to a desired position. The method further includes transmitting a second signal representing a result of the comparison and adjusting the implement based upon the second signal. In addition, the method includes setting the first position information of the inertial navigation system to second position information output from a positioning device based upon an error estimate.

DETAILED DESCRIPTION

Figure 1:
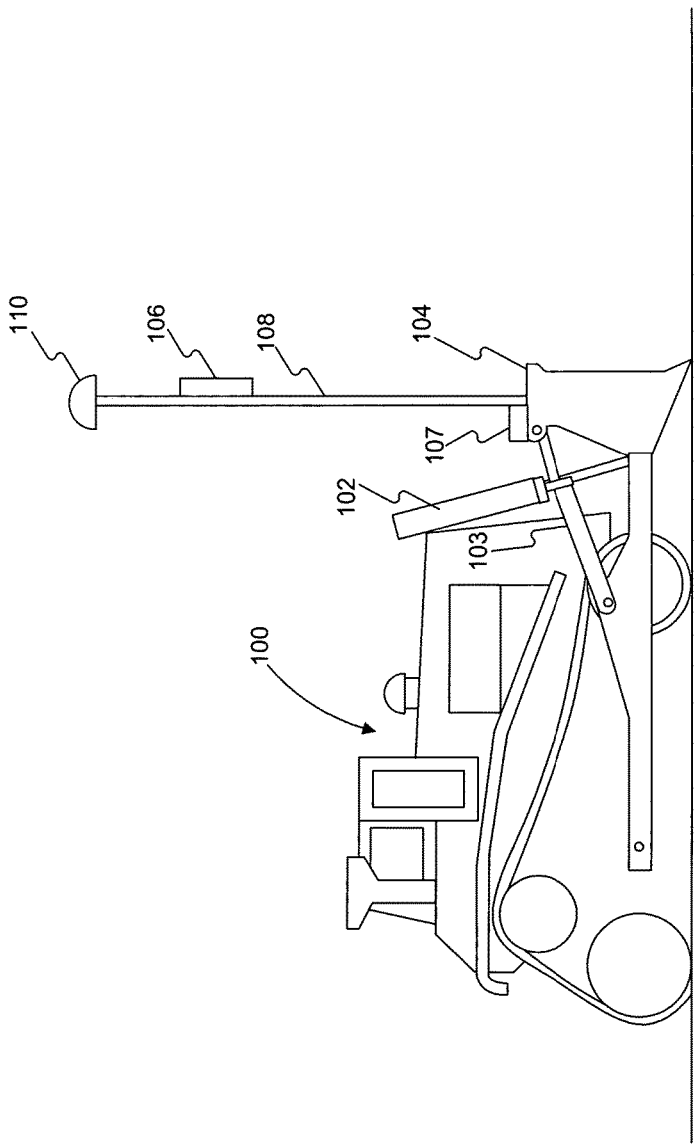
FIG. 1 illustrates an earthmoving machine that may incorporate aspects of the disclosed system.

FIG. 1 illustrates an earthmoving machine 100, having hydraulic mechanisms 102 and 103, implement 104, sensor 106, post 108, INS 107, and receiver 110. While this disclosed embodiment is a track-type tractor, it should be understood that the disclosed system has broad application to a wide variety of mobile machines.

As machine 100 operates on a worksite, hydraulic mechanisms 102 and 103 may operate to direct a motion of implement 104, which may be a bulldozer blade. For example, hydraulic mechanism 102, which may include a lift actuator, moves implement 104 between an up position and a down position. In addition, hydraulic mechanism 103, which may include a tilt actuator, tilts implement 104 forward and backward. Hydraulic mechanisms 102 and 103 may operate in accordance with electrical signals supplied thereto from internal devices within machine 100 (not shown). For example, electrical signals may actuate hydraulic mechanism 102 to move up and down, while other electrical signals may cause hydraulic mechanism 103 to move forward and backward.

Receiver 110 may receive a signal relating to its position (i.e., its specific position relative to the Earth) and may be mounted on a post 108 to receive the signal from one or more satellites associated with GPS, GLONASS or GNSS. The position may include a horizontal position and a vertical position of receiver 110. Because the relative position between receiver 110 and INS 107 and implement 104 is known, the position of implement 104 can be calculated. In particular, the position can be computed based on INS 107 using position processing elements as explained in greater detail below.

Figure 2:
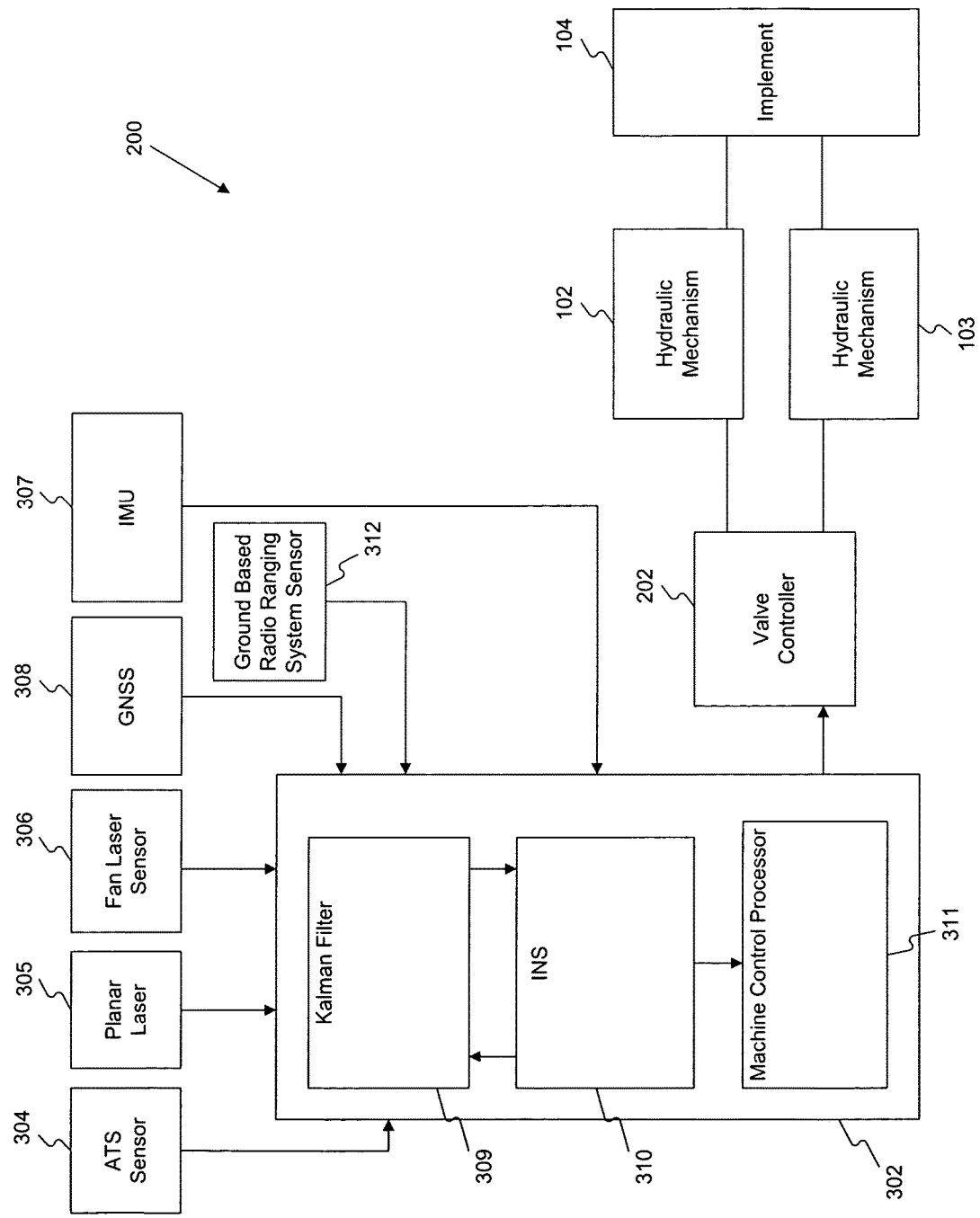
FIG. 2 illustrates an exemplary automatic implement control system.

In FIG. 1, INS 107 is shown on implement 104, however, it is noted that sensors for INS 107 may be mounted on implement 104 and INS 107 also includes a control processor (e.g., a computer) as further explained with respect to FIG. 2. The control processing element processes information from the sensor shown mounted on implement 104, as well as information from other sources.

Also, in a further embodiment, position sensors may be mounted on or in hydraulic mechanisms 102 and/or 103 or on or in other areas of the earthmoving machine. The position sensors may be used to determine the position of the implement, for example, by using the known distance between the position sensors and the implement and/or sensors to measure the angle between the sensors and implement.

Sensor 106 may be mounted on post 108. Sensor 106 also receives a signal carrying position information from other positioning devices, such as a plane laser, a fan laser or an automatic total system (ATS). The positioning devices may also be known as measuring devices. These positioning devices may be used in connection with survey equipment of a worksite. Sensor 106 may optionally be mounted on other locations of the earthmoving machine.

While the position may be calculated using GNSS signals recovered by receiver 110, the vertical position determined from the GNSS signals may be substituted with a vertical position information calculated from one or more of the rotary laser, fan laser, ATS, ground based radio ranging system or another positioning device. The vertical portion of GNSS position may be substituted because the vertical position calculated from the GNSS signal may be less accurate than by calculating the vertical position from one of the other positioning devices. In one embodiment, substitution of the vertical position information may occur in INS 107 and/or receiver 110.

An alternative to substituting the vertical position derived from the GNSS receiver is to combine the measurements from the external measuring systems such as the GNSS measurements, planar or fan laser measurements and/or ATS measurements in a computation that weights the measurements appropriately and determines a blended position solution. This blended position solution is provided to the INS.

A third alternative is to combine the external measurements and the inertial measurements in a single computation process that determines the best possible position.

Thus, using receiver 110, sensor 106, and/or other sensors, a position of implement 104 may be determined that includes the horizontal position and the vertical position of the implement.

Using the merged position (one position, for example, from the GNSS received by receiver 110 and optionally one position, for example, from a fan laser or rotary laser), machine 100 may be operated to alter a worksite in accordance with a predetermined plan. For example, machine 100 may be required to grade the ground surface of a worksite to a predetermined height or cover the worksite with material up to a predetermined height. An operator may view the position using display devices at a control panel of machine 100 and manually adjust the position of implement 104 to the vertical position conforming to the predetermined plan.

Machine 100 may also adjust implement 104 automatically using an automatic implement control system 200 (see FIG. 2). Automatic implement control system 200 automatically adjusts implement 104 by comparing the vertical position of implement 104 to a desired height (i.e., a height in conformance with the predetermined plan). Automatic implement control system 200 will next be described in greater detail below.

Automatic control system 200 includes a control computer 302, which determines the vertical position or elevation information of machine 100.

Computer 302 may include a kalman filter 309, INS 310, and machine control processor 311. The elevation information is fed to machine control processor 311, which may include a memory element, such as a EPROM, RAM or other suitable memory devices. Processor 311 may store desired elevation data corresponding to the predetermined plan. Processor 311 may retrieve the desired elevation data and compares it to the received elevation information. Based on this comparison, an output signal is supplied to valve controller 202, which, in turn, supplies appropriate control signals to hydraulic mechanism 102 and 103. In response to the control signals, hydraulic mechanism 102 and 103 act to discharge or receive hydraulic fluid to thereby expand or retract cylinders disposed therein. As a result, the position of implement 104 can be changed to a desired height.

As previously described, INS 310 may receive position and attitude measurements from an IMU, for example, IMU 307. In addition, kalman filter 309 receives measurement/position data from one or more sources, which may include a ATS sensor 304, a planar laser 305, a fan laser 306, a ground based radio ranging system sensor 312, and a GNSS 308. Generally, kalman filter 309 is known in the art and is a recursive, linear filter that may correct errors in an inertial navigation system (e.g., INS 310) using measurements from aiding sources, such as ATS sensor 304, planar laser 305, fan laser 306, ground based radio ranging system sensor 312, and GNSS 308. For example, kalman filter 309 receives absolute measurements or positions from the aiding sources and the current position from INS 310. Based upon a difference in those two positions or measurement sets, an error estimate is sent to INS 310. INS 310 uses the error estimate to make appropriate changes to the INS position. After the appropriate changes (either adding or subtracting the INS position depending on the error estimate), a corrected position is determined and sent to processor 310. Thus, the position of INS 310 is effectively re-set or re-initialized from the aiding sources through the error estimate sent by kalman filter 309. As noted above, depending on whether this corrected position is consistent with the predetermined site plan, processor 311 sends an appropriate signal to valve controller 202 to move implement 104 if needed.

Thus, the present disclosure provides computer 302 that controls a blade by an updated position of the blade based on the position computation from the INS at a rate, for example, of 100 times or greater per second, being the computational loop time of INS 310. Compared to other positioning systems that may update the position of the blade, for example, at a rate of to 10 times per second, the present disclosure allows for more accurate control of the blade because the blade position is being updated more frequently.

Also, the elevation and/or location information from INS 302 may be compared to elevation and/or location information received from one or more of ATS sensor 304, a planar laser sensor 305, fan laser 306, ground based radio ranging system sensor 306, or GNSS receiver 308 to determine if an unacceptable error is present in the elevation and/or location information from INS 310 ("gross error"). If a gross error is present, computer 302 may re-set the elevation information of INS 310, shut down the machine, or alert the operator of the gross error. Similarly, the INS position can also be used for determining if one or more of the positioning devices has a "gross error."

INDUSTRIAL APPLICABILITY

Figure 3:
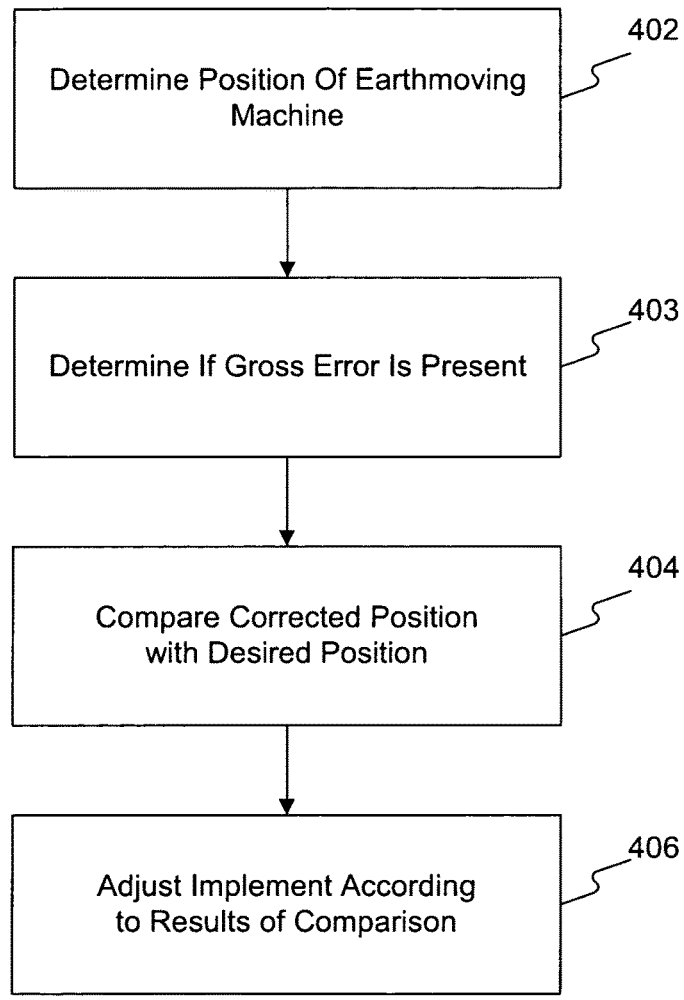
FIG. 3 is a flowchart illustrating a method for augmenting an inertial navigation system consistent with one exemplary embodiment.

Referring now to the operation of automatic implement control system 200, FIG. 3 illustrates a flowchart 400 for a method consistent with an exemplary embodiment of the present disclosure.

At stage 402, an automatic control system (e.g., system 200), determines a vertical and/or horizontal position of an earthmoving machine having the automatic control system based on information generated by sensors, for example, IMU 307. The position may be received from the INS at a rate of, for example, 100 Hz. In addition, an error of the INS may be constrained by examining inputs from other external measuring and/or positioning devices, such as a laser, fan laser, GNSS, and ATS through a kalman filter. The position of the INS may be re-set, by using error estimates of the actual position of the INS provided by the kalman filter which receives the absolute position from external positioning devices as described above, or receives absolute measurements and determines an absolute position by blending measurements from one or more external devices.

At stage 403, it is optionally determined if a gross error is present. An additional fail-safe test may be performed to determine if one or more the aiding sources (i.e., the external measuring and/or positioning devices) supplying information to the kalman filter is supplying an erroneous position. From time to time, information from one or more of the aiding sources may be blocked therefore, the computer 302 will propagate the solution based on the signal received from the IMU 107 If an erroneous position or "gross error" is present in the information being sent to the kalman filter from one or more of the aiding sources, the control computer may, continue to propagate the position computations based on the signals from the IMU, shut down the machine, or alert the operator of the gross error.

At stage 404, using stored information indicating a desired vertical position of the implement, circuitry within the machine (e.g., processor 311) compares the desired vertical position of the implement to the vertical position calculated (the corrected position) from INS 310. A control signal based upon the comparison is output to a valve controller (e.g., valve controller 202) in the automatic control system.

At stage 406, the valve controller automatically adjusts the implement to the desired height or location, if needed, in response to the control signal.

Method 400 may be implemented in earthmoving machines through circuitry and elements as described with regard to FIGS. 1-2. One advantage of the present disclosure is that the implement may be adjusted according to more accurate position data because the INS may supply position information more frequently than other positioning devices. The INS does not suffer from the disadvantage of uncontrolled drift because it is periodically re-initialized by other position devices such as a planar laser, fan laser, ATS, ground based radio ranging system or GNSS before the amount of drift becomes unacceptable. Thus, the present disclosure provides a system utilizing the dynamic tracking capability of INS and the accuracy of position information of the planar laser, fan lasers, ATS, the ground based positioning system or GNSS.

In addition, during short outages of the planar laser, fan laser, ATS, ground based radio ranging system, such as when another machine blocks the signal path or when the machine passes under an obstacle such as a tree, accurate position may still be obtained because the INS continues to propagate position data and the amount of drift is minimal during short interruption. In instances when there may be intermittent outages of the GNSS, the availability of position information from the rotary or fan laser, for example, may be used to constrain the drift of the INS.

Another advantage includes a system having redundant positioning to enable error checking and a safe shut down of any machine or alert to an operator if the error checking determines that gross errors have occurred. Specifically, the INS may be configured to check signals received from multiple positioning devices in order to determine if gross errors in the position information have occurred.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for automatically adjusting an adjustable earth-moving implement with respect to an earth-moving machine upon which the adjustable earth-moving implement is carried, comprising:
    an inertial navigation system, wherein
        the inertial navigation system is coupled to the adjustable earth-moving implement,
        the inertial navigation system is configured to output first position information, and
        the first position information is representative of a first position of the adjustable earth-moving implement from a plurality of possible three-dimensional implement positions with respect to a surface of a worksite;
    a processor configured to compare the first position information with a desired position of the adjustable earth-moving implement and generate a comparison signal in response thereto;
    a controller configured to adjust the adjustable earth-moving implement with respect to the machine upon which the adjustable earth-moving implement is carried based upon the comparison signal to adjust the earth-moving implement from the first position to the desired position; and
    a plurality of supplemental position measuring devices coupled to the adjustable earth-moving implement and communicatively coupled to the inertial navigation system, at least one supplemental position measuring device configured to output second position information representative of a supplemental first position of the adjustable earth-moving implement to the inertial navigation system, wherein
        the inertial navigation system periodically re-sets the first position information based upon a gross error estimate to re-calibrate the first position information and correct drift associated with one or more sensor readings from the inertial navigation system,
        the gross error estimate is generated at least partially based on an error estimate,
        the error estimate is generated as a function of the first position information and the second position information, and
        the gross error estimate is determined in response to the error estimate exceeding an unacceptable error threshold.

2. The system of claim 1, wherein at least one measuring device is selected from the group consisting of a planar laser, a fan laser, an automatic total station, a ground based radio ranging system, and a global navigation satellite system (GNSS).

3. The system of claim 2, wherein the second position information includes a horizontal position.

4. The system of claim 2, wherein the second position information includes a vertical position indicative of an elevation of the adjustable earth-moving implement with respect to the surface of the worksite.

5. The system of claim 1, wherein a position processing element is configured to calculate a horizontal position of the adjustable earth-moving implement relative to a surface of a worksite based on information received by a global navigation satellite system (GNSS).

6. The system of claim 1, wherein a position processing element is configured to calculate a vertical position of the adjustable earth-moving implement relative to a surface of a worksite based on information received by a global navigation satellite system (GNSS).

7. The system of claim 1, wherein the processor is configured to store the desired position and wherein the comparator is further configured to access the memory element.

8. The system of claim 1, further including a hydraulic mechanism, wherein the valve controller is configured to supply a control signal to the hydraulic mechanisms, the hydraulic mechanisms being actuated in response to the control signal.

9. The system of claim 1, wherein the inertial navigation system comprises one or more sensors configured to receive a signal used to calculate the first position information.

10. The system of claim 1, further including a receiver configured to receive a signal indicating a position of the machine from a global navigation satellite system.

11. The system of claim 1, wherein a kalman filter is configured to determine the error estimate.

12. A method for automatically adjusting an adjustable earth-moving implement for an earthmoving machine with respect to the earthmoving machine upon which it is carried, the method comprising:
receiving a first signal from an inertial navigation system representing first position information of the adjustable earth-moving implement, the inertial navigation system coupled to a plurality of positioning devices;
calculating a position based upon the first signal;
comparing the position to a desired position;
transmitting a second signal representing a result of the comparison;
adjusting the adjustable earth-moving implement with respect to the earthmoving machine upon which it is carried based upon the second signal; and
at least one of shutting down the earthmoving machine upon a gross error estimate, alerting an operator of the gross error estimate, and setting the first position information of the inertial navigation system to second position information output from one or more of the positioning devices based upon the gross error estimate, wherein
the gross error estimate is generated at least partially based on an error estimate,
the error estimate is generated as a function of the first position information and the second position information, and
the gross error estimate is determined in response to the error estimate exceeding an unacceptable error threshold.

13. The method of claim 12, wherein setting includes periodically updating the first position information with the second position information based upon the gross error estimate, wherein the one or more positioning devices is selected from the group consisting of a planar laser, a fan laser, an automatic total station, a ground based radio ranging system, and a global navigation satellite system (GNSS).

14. The method of claim 13, wherein the first position information further includes a horizontal position based upon a position relative to a surface of a worksite.

15. The method of claim 13, wherein the first position information further includes a vertical position based upon a position relative to a surface of a worksite.

16. The method of claim 13, further including calculating a horizontal position of the adjustable earth-moving implement relative to a surface of a worksite based on information received by a global navigation satellite system (GNSS).

17. The method of claim 13, further including calculating a vertical position of the adjustable earth-moving implement relative to a surface of a worksite based on information received by a global navigation satellite system (GNSS).

18. The method of claim 13, further including retrieving the desired position from a control processor.

19. The method of claim 13, wherein adjusting the adjustable earth-moving implement includes sending a control signal to one or more hydraulic mechanisms coupled to the adjustable earth-moving implement.

20. The method of claim 13, wherein receiving includes receiving the first signal associated with the first position information with a sensor.

21. The method of claim 13, further including receiving a signal indicating a position, in relation to a surface of a worksite, from a GNSS system that is separate from the inertial navigation system.

* * * * *

UNITED STATES PATENT AND TRADEMARK OFFICE
CERTIFICATE OF CORRECTION

PATENT NO. : 9,746,329 B2  
APPLICATION NO. : 11/594142  
DATED : August 29, 2017  
INVENTOR(S) : Mark Edward Nichols et al.

Page 1 of 1

It is certified that error appears in the above-identified patent and that said Letters Patent is hereby corrected as shown below:

In the Specification

Column 2, Line 39:
"(pitch, yaw, and roll). The linear degrees of freedom specify"
Should read:
--pitch, yaw, and roll. The linear degrees of freedom specify--.

Signed and Sealed this
Fifth Day of June, 2018

Andrei Iancu
*Director of the United States Patent and Trademark Office*